July 27, 1937. O. F. GOTTLIEB ET AL 2,087,907
BRAKE DRUM AND METHOD OF MAKING SAME
Filed July 22, 1935 2 Sheets-Sheet 1
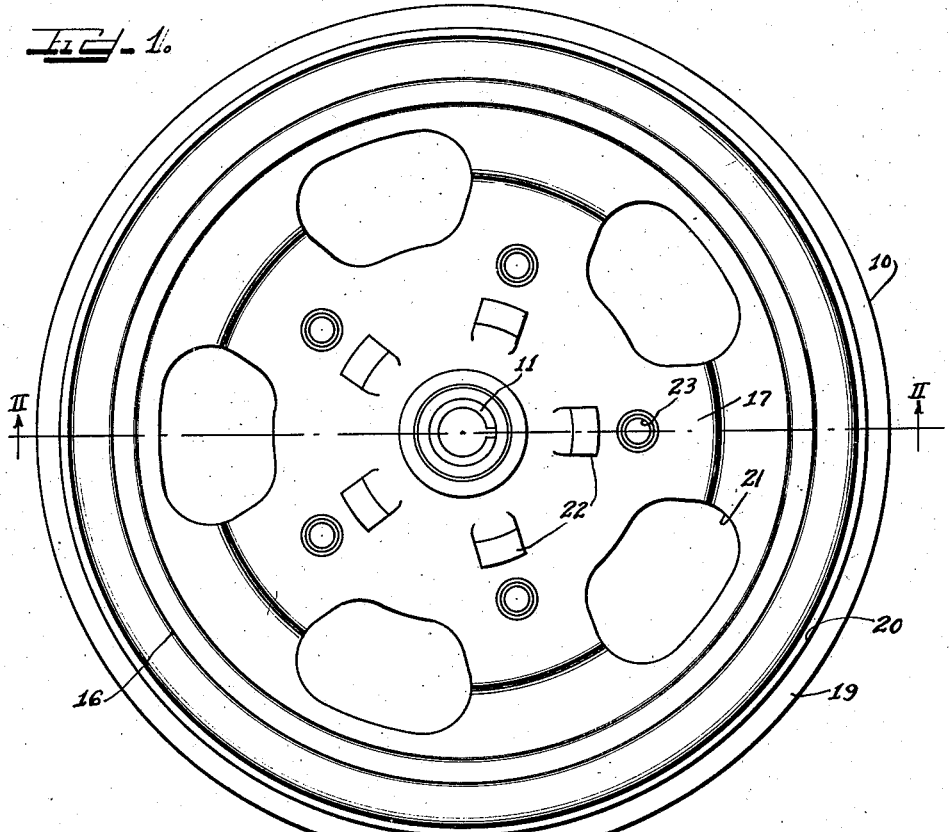
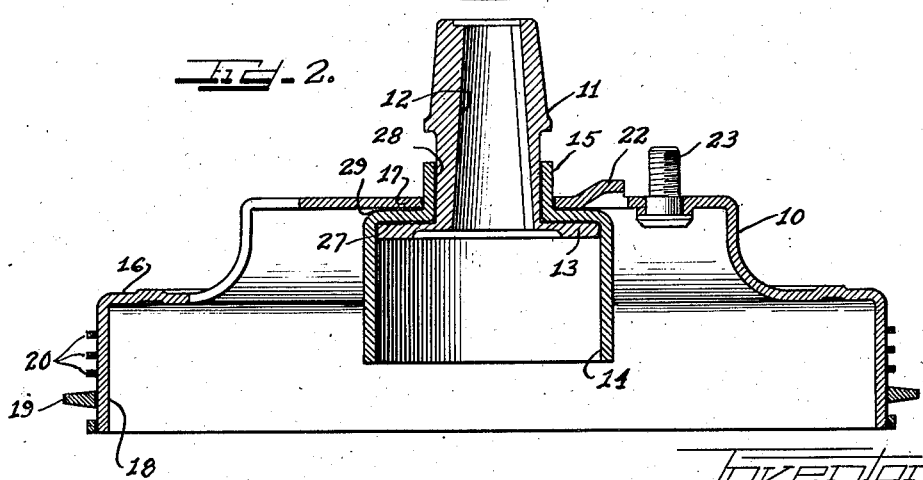
Inventors
Oscar F. Gottlieb.
Charles Robert Duncan.

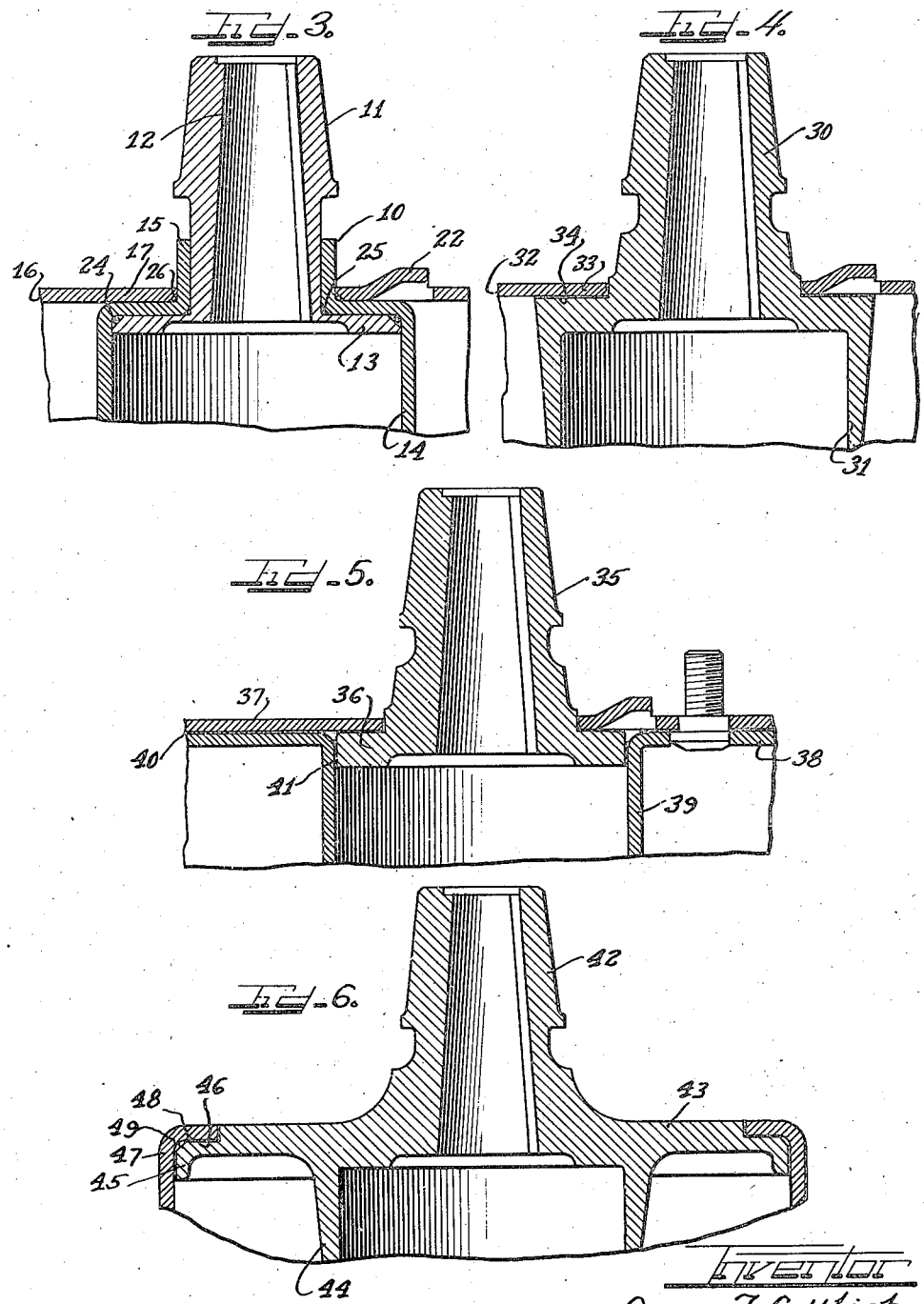

Patented July 27, 1937

2,087,907

UNITED STATES PATENT OFFICE 2,087,907

BRAKE DRUM AND METHOD OF MAKING SAME

Oscar F. Gottlieb, Lake Bluff, and Charles Robert Duncan, Waukegan, Ill., assignors to Oakes Products Corporation, North Chicago, Ill., a corporation of Michigan Application July 22, 1935, Serial No. 32,532

2 Claims. (Cl. 29—152.2)

This invention relates to a brake drum assembly and to a method of making the same. More particularly, the invention pertains to the manufacture of a brake drum of brazed construction formed from a forged hub and a sheet metal drum portion.

It has heretofore been customary to manufacture brake drums by a relatively elaborate and expensive process. We have now found, however, that a satisfactory brake drum can be manufactured at much lower cost by making the drum in several parts from forgings and stampings and brazing the parts together by means of a copper brazing material in a reducing atmosphere.

It is therefore an important object of this invention to provide a brake drum assembly that can be manufactured relatively inexpensively from forgings and stampings by brazing the parts together in a reducing atmosphere.

It is a further important object of this invention to provide a method of making brake drum assemblies of brazed construction, wherein the brazing is effected by means of a copper brazing material in a reducing atmosphere, such as hydrogen or the like.

Other and further important objects of this invention will be apparent from the disclosures in the specification and the accompanying drawings.

This invention (in a preferred form) is illustrated in the drawings and hereinafter more fully described.

On the drawings:

Figure 1 is a plan view of a brake drum assembly embodying the principles of our invention.

Figure 2 is a sectional view taken substantially on the line II—II of Fig. 1.

Figure 3 is a fragmentary enlarged sectional view of the same brake drum at one point of its manufacture.

Figure 4 is a fragmentary enlarged sectional view of a modified form of brake drum assembly.

Figure 5 is a fragmentary enlarged sectional view of a further modification of the invention.

Figure 6 is a fragmentary enlarged sectional view of a further modification of the invention.

As shown on the drawings:

In Figs. 1 to 3 inclusive, the reference numeral 10 indicates generally a brake drum assembly embodying the principles of our invention.

Said brake drum assembly 10 comprises a hub portion 11 forged from suitable metal stock to provide a spindle 12 and a flange 13 on the inner end and normal to the axis of said spindle. A cup-shaped member 14 having a reduced neck portion 15 receives the flanged end 13 of said hub portion and is secured thereto. A drum member 16, secured to said cup-shaped member 14 through its web 17, encloses said cup-shaped member to provide an annular flange 18 constituting the braking surface. A plurality of ribs or fins 19 and 20 are secured about the outer periphery of the flange 18 to increase the cooling efficiency of the drum.

The web 17 of the drum may be provided with a plurality of openings 21 to permit air circulation through the brake drum and also with struck-up portions 22 that cooperate with lugs 23 in securing the wheel on the spindle 12 and holding it in place thereon.

Both the cup-shaped member 14 and the drum 16 are formed from sheet metal by suitable die stamping and drawing operations. As shown in Fig. 3, certain edges of the hub, cup-shaped member and drum web are beveled or chamfered to provide, when the parts are assembled, clearances for the positioning of brazing wires, such as the wires 24, 25 and 26. The assembled parts are then heated to a temperature above the melting point of the brazing material, such as copper or brass, in a reducing atmosphere, whereupon the brazing material flows in between the abutting surfaces, as indicated at 27, 28 and 29 (Fig. 2), to provide a firm braze at those joints. While these brazed joints are pictorially represented as distinct layers of some relative thickness, actually the metal surfaces are in close contact and are brazed directly together without any intervening continuous layer of the brazing material. The brazing metal wets the surfaces of the parts to be joined under the temperatures obtaining in a furnace having a reducing atmosphere and flows readily between said surfaces despite the closeness of fit. In fact, the closer the fit of the various parts, the stronger will be the braze effected.

It will be understood, of course, that it is not necessary to bevel off the edges of the various parts, as indicated in Fig. 3, to provide spaces for the brazing wires 24, 25 and 26, since these wires may be laid in position adjacent the joints, or on top of them. Where copper wires are used, welding temperatures of around 2000 and 2050° F. are satisfactory, while with brass brazing wires, the temperatures may be in the neighborhood of 1800 to 1850° F.

Figs. 4, 5 and 6 show modifications of construction. In Fig. 4, the reference numeral 30 indicates a wheel-receiving spindle having an integrally formed skirt or cup-shaped member 31, the whole being produced by suitable forging operations. A drum member 32 is secured along the inner periphery of the web portion 33 to the shoulder 34 formed between the cup-shaped member or skirt 31 and the spindle 30. This may be accomplished by brazing the two parts together with a suitable copper or brass brazing material in a reducing atmosphere.

In Fig. 5, the spindle and hub portion, indicated generally by the reference numeral 35, is forged from suitable metal stock to provide a radially extending flange 36, to which is brazed the web portion of a drum 37 formed of stamped metal. A second sheet metal stamping 38 of annular shape and provided with concentric flanges 39 is brazed to the inside of the web 37 and also to the outer periphery of the flange 36, as at 40 and 41, respectively.

In Fig. 6, the hub portion constitutes a forging that provides a spindle 42, a web portion 43 extending normally thereto, an inner annular flange 44 and an outer peripheral flange 45. The outer flange 45 is recessed, as at 46, to receive the flanged periphery of a drum 47 that is adapted to be brazed to the web 43, as at 48. To facilitate the assembly, the corner of the peripheral flange 45 is beveled as at 49 to provide a clearance for the insertion of a brazing wire.

It is thus apparent that in all forms of our invention the hub portion is a forging and the drum proper is of stamped sheet metal. The inner cup-shaped member, or skirt, may either be formed integrally with the spindle as a part of the hub forging or may be formed from sheet metal by suitable stamping and drawing operations. The parts are then brazed together by means of a copper containing brazing material and by the use of a reducing atmosphere, such as an atmosphere of hydrogen, carbon monoxide or mixtures thereof. This makes for considerable economy in the manufacture of brake drums as compared with the cost of manufacturing forged brake drums as heretofore practiced.

The cup-shaped member 14 is applied over the flange 13 of the spindle 12 by suitable manufacturing methods, such, for example, as by spinning, thus forming the neck 15.

The purpose of the member 14 is to provide a cup for receiving bearings for the axle, which extends through the member 14 into the taper of the spindle 12, the bearings lying between the axle and the inner surface of the member 14 as is well understood in the art.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A brake drum assembly, comprising a forged metal hub having a wheel-receiving spindle and an annular flange normal to the axis of said spindle, a stamped and drawn cup-shaped member of sheet metal receiving said hub and brazed to said flange and spindle, and a drum of stamped and drawn sheet metal brazed to said cup-shaped member and enclosing the same.

2. The method of making a brake drum assembly which comprises forging a spindle with a flange to form a hub, stamping and drawing sheet metal to provide a cup-shaped member for receiving said flange, stamping and drawing sheet metal to form a drum for attachment to said flange, and copper brazing said flange, cup-shaped member and drum together in a reducing atmosphere.

OSCAR F. GOTTLIEB.
CHARLES ROBERT DUNCAN.